United States Patent [19]

Nagai et al.

[11] Patent Number: 4,872,024

[45] Date of Patent: Oct. 3, 1989

[54] PRINT INSPECTION METHOD, PRINT INSPECTION APPARATUS AND AUTOMATIC PRINT SORTING SYSTEM

[75] Inventors: Teiji Nagai, Fujisawa; Ryo Sakazume, Tokyo; Kouichi Hanazawa, Warabi; Hiroshi Nakayama, Kasukabe; Yoshio Minagawa, Tokyo, all of Japan

[73] Assignees: Sapporo Breweries, Ltd., Tokyo; Scan Technology Co., Ltd., Warabi, both of Japan

[21] Appl. No.: 251,393

[22] Filed: Sep. 30, 1988

[30] Foreign Application Priority Data

Jan. 29, 1988 [JP] Japan ................... 63-17154

[51] Int. Cl.$^4$ .............. G06K 9/00; B41V 3/04; G01D 21/00
[52] U.S. Cl. ................. 346/1.1; 209/583; 209/939; 346/25; 346/75; 358/101; 358/106; 382/8; 382/34
[58] Field of Search ............ 346/33 R, 33 A, 75, 346/140 R, 25, 1.1; 382/1, 2, 8, 34; 358/101, 106; 209/583, 939

[56] References Cited

U.S. PATENT DOCUMENTS

| | | | |
|---|---|---|---|
| 4,019,187 | 4/1977 | Omori | 346/75 |
| 4,345,312 | 8/1982 | Yasuye | 382/8 |
| 4,641,355 | 2/1987 | Hongo | 382/34 |
| 4,758,782 | 7/1988 | Kobayashi | 358/106 X |

Primary Examiner—Joseph W. Hartary
Attorney, Agent, or Firm—Oblon, Spivak, McClelland, Maier & Neustadt

[57] ABSTRACT

A method for inspecting whether a print pattern composed of a number of dots is acceptable, an apparatus for inspecting such a print pattern, and an automatic print sorting system are disclosed. A print pattern of an acceptable print sample and a print pattern printed on an article to be inspected are compared with respect to dot distribution, dot density, and other factors. The print patterns on all articles on a high-speed production line can be automatically inspected.

12 Claims, 3 Drawing Sheets

F I G. 2(a) 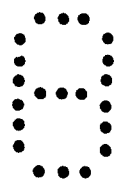 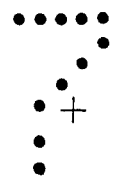 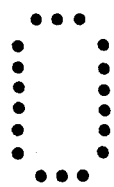
F I G. 2(b) 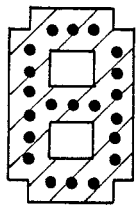 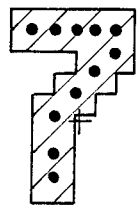 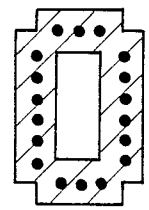
F I G. 2(c) 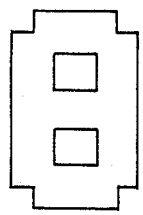 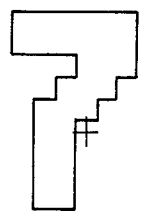 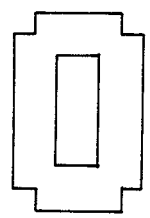
F I G. 3(a) 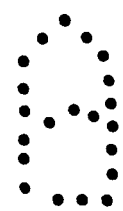 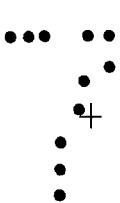 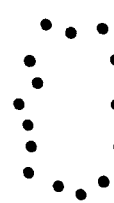
F I G. 3(b) 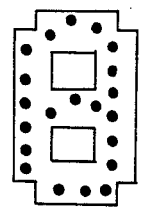 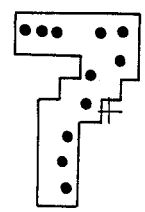 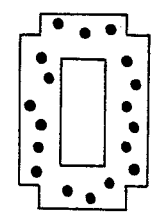

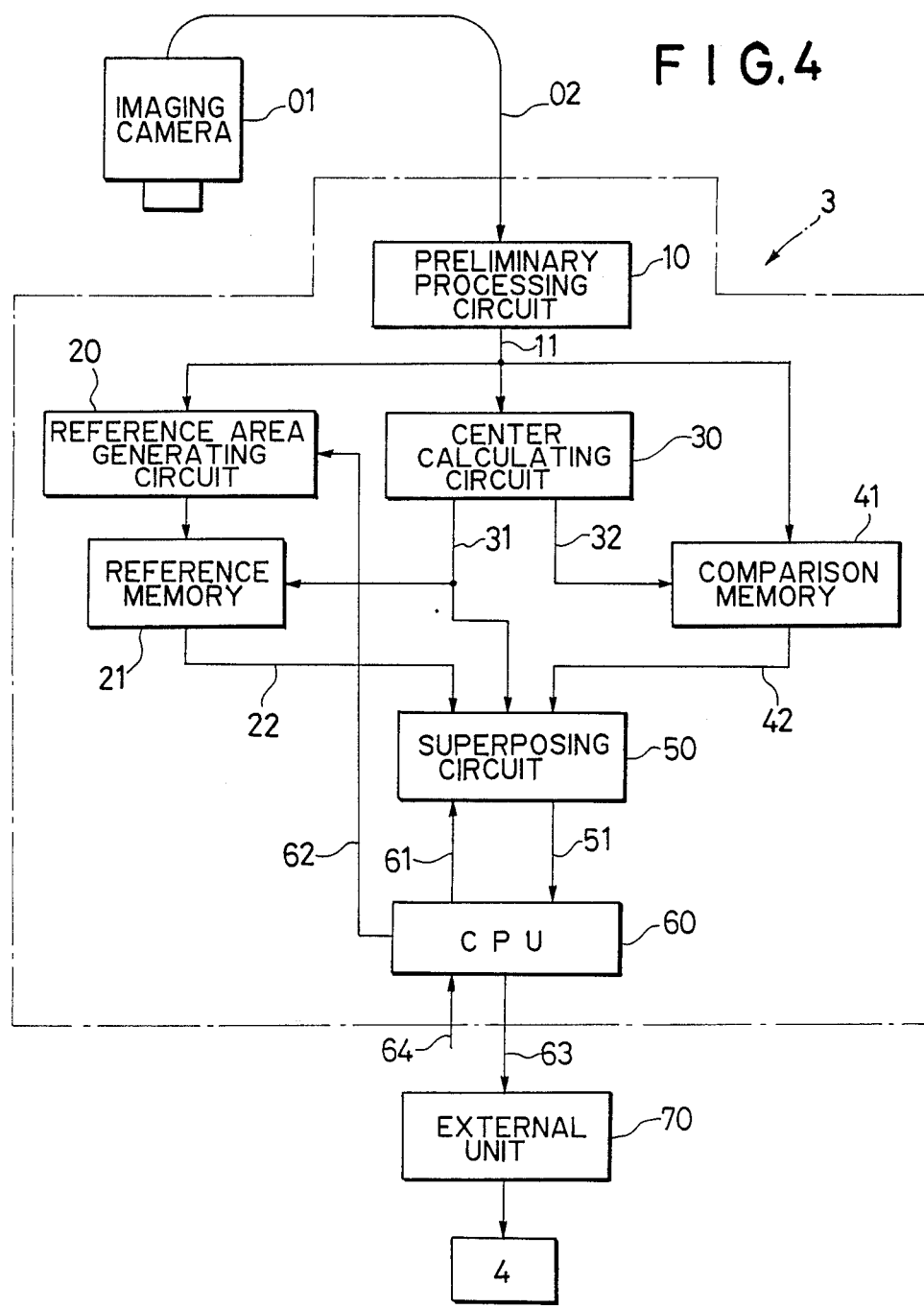

PRINT INSPECTION METHOD, PRINT INSPECTION APPARATUS AND AUTOMATIC PRINT SORTING SYSTEM

BACKGROUND OF THE INVENTION

The present invention relates to a print inspection method, a print inspection apparatus, and an automatic print sorting system, and more particularly to a method of and an apparatus for inspecting whether a print pattern composed of dots printed by an ink jet printer or similar printer is acceptable, and an automatic system for sorting acceptable print patterns.

In the production of foods, beverages, and other products, it has been customary to indicate product type, date of production, and other information on the products as a series of letters, numerals, and symbols to distinguish them. These letters, numerals, and symbols are usually printed on the surface of a product or on a label or similar object attached to the product by an automatic printing apparatus. At times, there may be caused print failures such as missing letters or numerals, blurring, erasuring, double printing, ink stains, and skewing. Since the printed letter, numerals, and symbols on products represent use, performance, duration of use, product liability, and other data, it is necessary to inspect all of the printed products to see whether the printed patterns are acceptable.

The inventor studied the inspection of printed patterns on a canned beer production line prior to the present invention.

On a canned beer production line, a large number of canned products are moved by a conveyor at such a high speed that the time interval between two adjacent products as they pass through a certain fixed point is, for example, one-tenth second or less. Such a high-speed production line employs an ink jet printer for printing a desired print pattern on rapidly moving products by applying ink particles from an ink jet nozzle to the products at a high speed.

It is impossible to rely upon a visual inspection process for checking whether the printed patterns are acceptable or not. At present time, the printed information is checked by sampling the products as they are printed by the ink jet printer.

There has been a strong demand for the automatic inspection of printed patterns on a high-speed production line with two adjacent products spaced by, for example, more than one-tenth second.

The inventor has analyzed the automatization of inspection of printed patterns on such a high-speed production line, and, as a result, found that an existing inspection system based on image recognition technology cannot be applied directly to automatic print inspection because of various problems described below.

Since the printed products move rapidly, the printed patterns must be inspected quickly.

A letter, a numeral, or a symbol printed by an ink jet printer comprises a matrix of dots. A line segment of a printed letter, for example, is composed of closely spaced dots. Because a printed pattern is represented by a cluster of ink dots, machine-based automatic recognition requires a determination of where the cluster of dots is terminated, i.e., a determination of the spatial extent of one group of related dots. Automatic recognition of a character composed of dots is difficult to achieve, unlike automatic recognition of a character made up of continuous line segments.

As described above, a pattern is printed on a product by an ink jet printer by applying ink at a high speed to the product which is rapidly moving. Therefore, the printed letter, numeral, or symbol is often subjected to deformation such as elongation, contraction, or distortion. Frequently, printed dots may be positioned in contact with each other or too widely spaced from each other. Difficulty arises in establishing a criterion for determining whether a certain printed pattern is acceptable.

According to one conventional print inspection method, a standard pattern composed of continuous line segments is registered in advance, and a printed pattern is inspected by comparison with the registered standard pattern to see if the inspected pattern is in accord with the standard pattern. The inventor's research indicates that, if such an existing print inspection method were employed to inspect a pattern printed by an ink jet printer, most of inspected patterns would not match the standard pattern and would be rejected as unacceptable as a result of pattern matching. Lowering the criterion would solve the problem, but would be liable to judge those printed patterns which do not meet a desired standard as acceptable, and hence would fail to carry out an appropriate inspection process.

Dates of production printed on beer cans change as needed. Therefore, in the print inspection method employing a registered standard pattern for print inspection, it is necessary to register a standard pattern as often as such dates change. The registration of standard patterns is a special process different from the inspection process itself on the production line. The registration process is complex and puts an extra burden on the operator.

SUMMARY OF THE INVENTION

In view of the aforesaid conventional problems and the results of research by the inventor, it is an object of the present invention to provide an automatic print pattern inspection apparatus which can automatically inspect whether printed letter, numeral, and symbol patterns composed of dots are acceptable, which does not require a standard pattern to be employed, and which can inspect all of the products that are printed.

According to the present invention, a print pattern printed on an article is inspected by determining whether it matches a reference pattern. The reference pattern used is not a conventional standard pattern composed of continuous line segments and registered through a special registering process, but is produced by moving an article printed with a print pattern which meets a certain standard (i.e., an acceptable printing pattern) on a conveyor and by reading the image data of the print pattern of the acceptable print sample in the same manner as when the image data of the print pattern on the article are read. Therefore, the reference pattern employed in the inspection apparatus is not required to be varied or modified at all even if a print pattern of letters, numerals, and symbols to be inspected is changed or the shape of such letters, numerals, and symbols is changed When such a print pattern is to be changed, a desired article with an acceptable print pattern (acceptable print sample) is moved on the conveyor again, and the print pattern thereon is read in.

The reference pattern is a print pattern printed on an article by an ink jet printer in the same manner as the printed pattern printed on the article to be inspected. The reference pattern and the print pattern on the article to be inspected are compared not by determining whether the print patterns are in accord with each other, but by recognizing the print pattern as a cluster of dots and comparing the distribution of the dots and the number of dots in a given area. When the reference pattern and the print pattern being inspected match each other above a minimum level, the print pattern is determined as acceptable. As a result, those print patterns which are largely deformed, blurred, or erased can reliably be rejected as unacceptable print patterns. Other print patterns which may indicate a production date or other data can be determined as acceptable print patterns. Accordingly, print patterns of the above type can be inspected in a process that is most suitable for those print patterns, and the print patterns on all articles produced on a high-speed production line can be automatically inspected.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIGS. 2(a) through 2(c) are diagrams showing the manner in which a reference area is produced from a print pattern of an acceptable print sample, FIG. 2(a) showing a print pattern printed by an ink jet printer, FIG. 2(b) showing a process of producing a reference area around dots of the print pattern; and FIG. 2(c) showing the produced reference area;

FIGS. 3(a), and 3(b) are diagrams showing the manner in which a print pattern to be inspected is determined as acceptable, FIG. 3(a) illustrating a print pattern printed by an ink jet printer, and FIG. 3(b) illustrating the print pattern superposed on the reference area;

FIG. 4 is a block diagram of a print inspection apparatus according to the present invention.

DESCRIPTION OF THE PREFERRED EMBODIMENT

Figure 1:
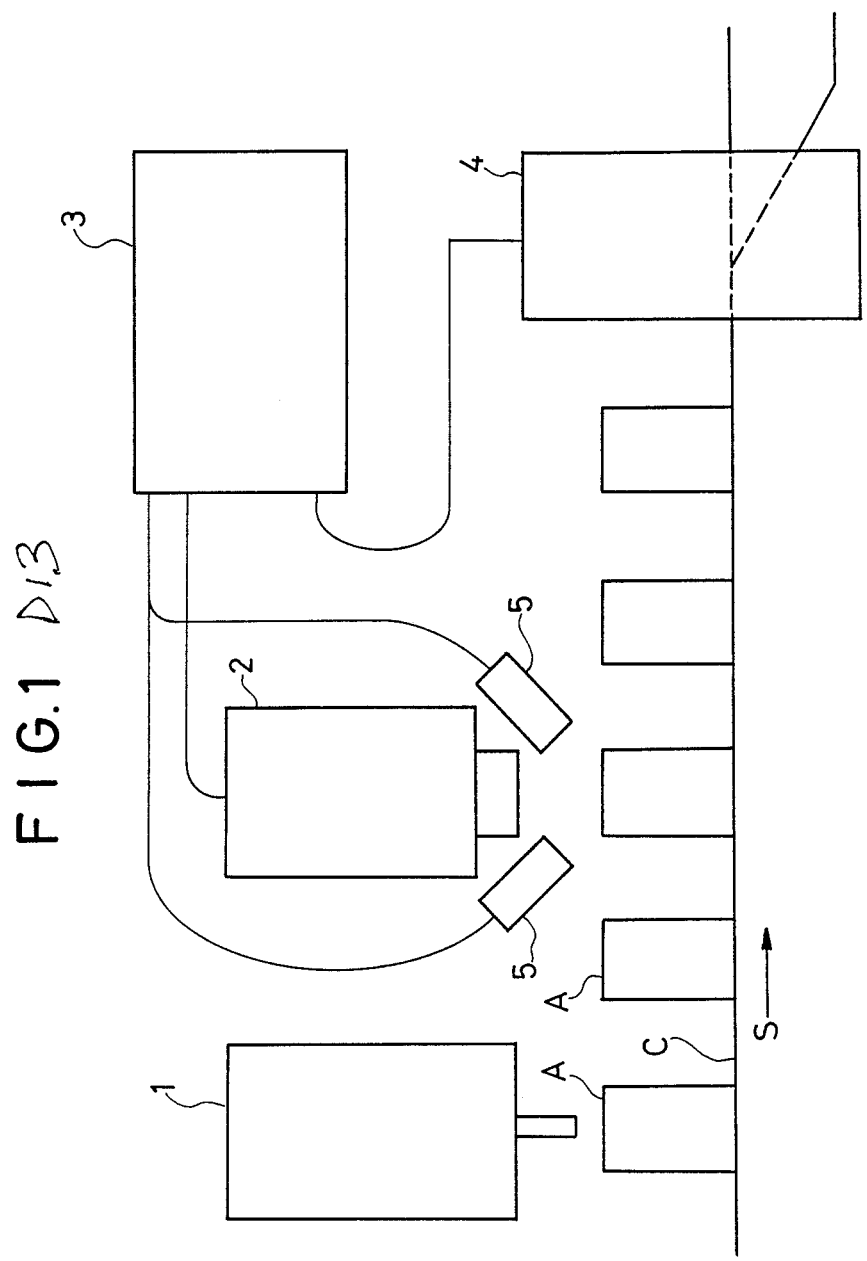
FIG. 1 is a schematic view of an automatic print sorting system according to the present invention.

FIG. 1 shows an automatic print sorting system for printing articles such as can products with an ink jet printer, inspecting print patterns on the can products to check if they are acceptable, and thereafter sorting can products with acceptable print patterns.

Articles A to be inspected, such as beer cans, are moved at a substantially constant speed in the direction of the arrow S by a feed mechanism C such as a conveyor. An ink jet printer 1 is disposed above the articles A for printing a predetermined pattern composed of letters, numerals, and/or symbols on the articles A. An imaging camera 2 is positioned adjacent to the ink jet printer 1 for reading, as image data, the print patterns on the articles A. The imaging camera 2 is associated with illuminating units 5 and is electrically connected to a processor 3. A sorting unit 4 is positioned at the downstream end of the feed mechanism C for sorting articles with acceptable print patterns and those with unacceptable print patterns.

The articles A which are successively fed along by the feed mechanism C are printed by the ink jet printer 1 when they are delivered below the ink jet printer 1, and then moved toward a position below the imaging camera 2. When an article A is positioned directly below the imaging camera 2, the image camera 2 reads an image of the article A which is illuminated by the illuminating units 5. The image is then converted to an electric signal which is sent to the processor 3. The processor 3 quantizes the electric image signal and processes it in various ways. Finally, the processor 3 determines whether the print pattern on the article A is acceptable, and applies a signal to the sorting unit 4 to enable the latter to sort the article A.

A method of determining whether the print pattern on an article A is acceptable will be described below.

Prior to inspection of the article A, an acceptable print sample which has been inspected and determined as acceptable is prepared. The print pattern of such an acceptable print sample is shown in FIG. 2(a) where the mark "+" indicates the center of the overall pattern.

Then, the acceptable print sample is placed on the conveyor S, which is then actuated to move the acceptable print sample into the position below the imaging camera 2. The imaging camera 2 then reads the print pattern of the acceptable print sample into the processor 3.

The processor 3 produces square areas of a certain width around each of the dots of the read print pattern. Where square areas are overlapped, they are joined successively into an area as indicated by the shaded portions in FIG. 2(b). In this manner, the reference area shown in FIG. 2(c) is prepared and stored in the processor 3.

The number of dots present in the reference area and the relationship between the reference area and the dots (represented by dot distribution, density, and other factors), as shown in FIG. 2(b), are detected and stored as dot information of the acceptable print sample.

Then, the article A starts being inspected. In the same manner as when the print pattern of the acceptable print sample is read, the print pattern on the article A is read into the processor 3. It is assumed here that the print pattern on the article A is somewhat deformed as illustrated in FIG. 3(a).

The print pattern on the article A is then superposed on the reference area shown in FIG. 2(c) with the center of the print pattern on the article A being aligned with the center of the reference area as shown in FIG. 3(b). The number of dots present within the reference area, the dot distribution, and other factors are then detected and stored as dot information of the article A.

The stored dot information of the acceptable print sample and the stored dot information of the article A are compared to determine whether they match each other above an acceptable minimum level.

If necessary, the reference area or the print pattern to be inspected is turned clockwise or counterclockwise, and then the print pattern is superposed on the reference area to obtain dot information thereof. Then, the dot information is compared with the dot information of the reference area to see if they match each other.

Based on the results of comparison, it is determined whether the print pattern on the article A is acceptable.

A specific internal structure and processing sequence of the processor 3 will hereinafter be described with reference to FIG. 4.

In FIG. 4, an image signal 02 produced by an imaging camera 01 is applied to a preliminary processing circuit 10, which quantizes the image data of the received image signal 02 and recognizes the dots of the image data. As shown in FIGS. 2(a) through 2(c), the numerals printed by the ink jet printer are made up of a cluster of dots. The preliminary processing circuit 10 recognizes the position of each dot of the print pattern as one pixel, converts each dot data to binary data of "1" or "0", and thereafter issues the binary data as character pattern data 11.

A reference area generating circuit 20 receives the character pattern data 11 from the preliminary processing circuit 10 in response to a reference area generation command 62 from a CPU 60, only when the imaging camera 01 images an acceptable print sample on a reference article. The reference area generating circuit 20 generates a reference area as indicated by the shaded portions in FIG. 2(b) from the received image data or character pattern data 11. As described above, the reference area generating circuit 20 produces square areas of a certain width around each of the dots of the read print pattern. Where square areas overlap, they are joined successively into an area as shown in FIG. 2(b). The reference area thus produced is stored in a reference memory 21.

The character pattern data 11 of the print pattern on an article to be inspected supplied from the preliminary processing circuit 10 is stored in a comparison memory 41.

A center calculating circuit 30 calculates the coordinates of the center of the character pattern data 11 of both the reference character pattern or acceptable print sample and the character pattern on the article to be inspected, received from the preliminary processing circuit 10. The center of the reference character pattern and the center of the character pattern of the article to be inspected are distinguished from each other and stored separately. The coordinates of the center of the reference character pattern are supplied to the reference memory 21 as reference area center coordinates 31. The reference memory 21 supplies reference area data 22 to a superposing circuit 50, the reference area data 22 being corrected in address according to the reference area center coordinates 31 from the center calculating circuit 30. The coordinates of the center of the character pattern to be compared are supplied to the comparison memory 41 as comparison character pattern center coordinates 32. The comparison memory 41 supplies comparative character pattern data 42 to the superposing circuit 50, the comparative character pattern data 42 being corrected in address according to the comparative character pattern center coordinates 32.

The superposing circuit 50 superposes the reference area data 22 and the comparative character pattern data 42 for comparison. More specifically, the relationship between the shaded portions shown in FIG. 2(b) and the dots of the print pattern is determined by extracting the positions and the number of dots (of the comparative character pattern data 42) in the shaded portions (of the reference area data 22). The extracted dot positions and number are sent as determination data 51 to the CPU 60.

The CPU 60 makes a judgment based on the determination data 51 in view of a preset sensitivity set by the user. The CPU 60 issues an angular corrective value 61 to the superposing circuit 50, which turns the reference area data 22 about the reference area center coordinates 31 according to the angular corrective value 61, superposes the reference area data 22 and the comparative pattern data 42, and supplies determination data 51 to the CPU 60. The CPU 60 issues several angular corrective commands, receives determination data 51 for each of the angular corrective commands, and applies a final determination result 63 to an external unit 70. Based on the final determination result 63 applied to the external unit 70, the sorting unit 4 is operated to sort the article A as acceptable or not.

As described above, the present invention is effective in achieving automatic inspection of entire print patterns on a high-speed production line, which has heretofore not been impossible to accomplish. More specifically, an entire print pattern is recognized as a cluster of dots, and a pattern matching process is employed to determine the number of dots, dot distribution, dot density, and other factors in a given area to see if the print pattern is acceptable. Since reference data is produced by reading image data of an acceptable print pattern in the same manner as when image data of a print pattern to be inspected is read, the reference data or pattern employed in the inspection apparatus is not required to be varied or modified at all even if a print pattern of letters, numerals, and symbols to be inspected is changed or the shape of such letters, numerals, and symbols is changed. The inspection apparatus can be easily handled because reference data can be produced simply by reading a desired acceptable print pattern, and hence the inspection apparatus can be introduced into an inspection site with ease.

Although a certain preferred embodiment has been shown and described, it should be understood that many changes and modifications may be made therein without departing from the scope of the appended claims.

What is claimed is:

1. A method of inspecting whether a print pattern composed of plural dots printed on an article meets a predetermined standard, comprising the steps of:

recognizing the positions of each of the dots of a print pattern of an acceptable print sample which meets the predetermined standard, and quantizing the dots into binary data;

producing unit areas around the positions of each of the dots based on said binary data, joining those unit areas which at least partly overlap, into joined area, recognizing the unit areas and joined areas as a reference area, and storing said reference area;

detecting the distribution, or number, or both, of the dots in said reference area, and storing the detected distribution, or number, or both, of the dots as dot information of the print pattern of the acceptable print sample;

calculating the coordinates of the center of the print pattern of said acceptable print sample based on said binary data, and storing the calculated coordinates;

recognizing the positions of each of the dots of a print pattern printed on an object to be inspected, and quantizing the dots into binary data;

calculating the coordinates of the center of the print pattern on the object based on said latter binary data, and storing the calculated coordinates;

referring to the coordinates of the center of the print pattern on said object and the coordinates of the center of the print pattern of said acceptable print sample, superposing said reference area and said print pattern on said object while bringing said centers into alignment with each other, detecting the distribution, or number, or both, of the dots of the print pattern on said object within said reference area, and storing the detected distribution, or number, or both, of the dots as dot information of the print pattern on said object; and comparing the dot information of the print pattern on said object with the dot information of the print pattern of said acceptable print sample, determining the extent of agreement between the compared dot information, determining whether the print pattern on said object is acceptable, and issuing the result of the determination.

2. A method according to claim 1, wherein the print pattern on said object is printed by an ink jet printer.

3. A method according to claim 1, wherein when said reference area and said print pattern on said object are superposed and the distribution or number of the dots of the print pattern on said object within said reference area is detected, either said reference area or said print pattern on said object is angularly moved about the coordinates of said aligned centers after one batch of dot information of said print pattern on said object has been obtained, and thereafter, said reference area and said print pattern on said object are superposed to obtain another batch of dot information of said print pattern on said object, then these steps are repeated a plurality of times, the plurality of batches of dot information thus obtained are compared with the dot information of the print pattern of said acceptable print sample, and the print pattern on said object is determined as acceptable when the compared dot information matches the dot information of the print pattern of the acceptable print sample beyond a minimum level based on the results of comparison.

4. A method according to claim 1, further comprising the step of:

sorting the print pattern on said object as an acceptable pattern or an unacceptable pattern based on the results of the determination issued after whether the print pattern on said object is acceptable has been determined.

5. A method according to claim 1, wherein after the dot information of the print pattern of said acceptable print sample has been stored, the entire print patterns on a plurality of objects are successively inspected.

6. An apparatus for inspecting whether a print pattern composed of plural dots printed on an article meets a predetermined standard, comprising:

preliminary processing means for recognizing the positions of each of the dots of a print pattern, and quantizing the dots into binary data;

reference area generating means for producing unit areas around the positions of each of the dots based on binary data of a print pattern of an acceptable print sample, issued from said preliminary processing means, joining those unit areas which are at least partly overlapped, into joined areas, recognizing the unit areas and joined areas as a reference area, and storing said reference area;

reference area storing means for storing the reference area generated by said reference area generating means;

first dot information storing means for detecting the distribution, or number, or both, of the dots in said reference area, and storing the detected distribution, or number, or both, of the dots as dot information of the print pattern of the accepted print sample;

center calculating means for calculating the coordinates of the center of the print pattern based on said binary data;

object print pattern storing means for storing binary data of a print pattern printed on an object to be inspected, issued from said preliminary processing means;

superposing means for referring to the coordinates of the center of the print pattern on said object and the coordinates of the center of the print pattern of said acceptable print sample, which have been calculated by said center calculating means, superposing said reference area and said print pattern on said object while bringing said centers into alignment with each other, and detecting the distribution, or number, or both, of the dots of the print pattern on said object within said reference area;

second dot information storing means for storing the detected distribution, or number, or both, of the dots as dot information of the print pattern on said object; and determining means for comparing the dot information of the print pattern on said object stored in said second dot information storing means with the dot information of the print pattern of said acceptable print sample stored in said first dot information storing means, determining the extent of agreement between the compared dot information, determining whether the print pattern on said object is acceptable, and issuing the result of the determination.

7. An apparatus according to claim 6, wherein the print pattern on said object is printed by an ink jet printer.

8. An apparatus according to claim 6, wherein when said reference area and said print pattern on said object are superposed and the distribution or number of the dots of the print pattern on said object within said reference area is detected, said superposing means angularly moves either said reference area or said print pattern on said object about the coordinates of said aligned centers, thereafter, superposes said reference area and said print pattern on said object, repeats the angularly moving and superposing process a plurality of times to obtain a plurality of batches of dot information, wherein said second dot information storing means stores said plurality of batches of dot information obtained by repeating said angularly moving and superposing process, and wherein said determining means compares the stored batches of dot information with the dot information of the print pattern of said acceptable print sample, and determines the print pattern on said object as acceptable when the compared dot information matches the dot information of the print pattern of the acceptable print sample beyond a minimum level based on the results of comparison.

9. An apparatus according to claim 6, further comprising automatic sorting means for sroting the print pattern on said object as an acceptable pattern or an unacceptable pattern based on the results of the determination issued after whether the print pattern on said object is acceptable has been determined.

10. An automatic print sorting system comprising:

printing means for printing a print pattern composed of dots on an object;

feed means for feeding the object with the print pattern printed thereon by said printing means;

an imaging camera for imaging the print pattern on said object which is fed by said feed means;

preliminary processing means for reading the print pattern imaged by said imaging camera as image data, recognizing the positions of each of the dots of the print pattern, and quantizing the dots into binary data;

reference area generating means for producing unit areas around the positions of each of the dots based on binary data of a print pattern of an acceptable print sample, issued from said preliminary processing means, joining those unit areas which are at least partly overlapped, into joined areas, recognizing the unit areas and joined areas as a reference area, and storing said reference area;

reference area storing means for storing the reference area generated by said reference area generating means;

first dot information storing means for detecting the distribution, or number, or both, of the dots in said reference area, and storing the detected distribution, or number, or both, of the dots as dot information of the print pattern of the acceptable print sample;

center calculating means for calculating the coordinates of the center of the print pattern based on said binary data;

object print pattern storing means for storing binary data of a print pattern printed on the object, issued from said preliminary processing means;

superposing means for referring to the coordinates of the center of the print pattern on said object and the coordinates of the center of the print pattern of said acceptable print sample, which have been calculated by said center calculating means, superposing said reference area and said print pattern on said object while bringing said centers into alignment with each other, and detecting the distribution, or number, or both, of the dots of the print pattern on said object within said reference area;

second dot information storing means for storing the detected distribution, or number, or both, of the dots as dot information of the print pattern on said object;

determining means for comparing the dot information of the print pattern on said object stored in said second dot information storing means with the dot information of the print pattern of said acceptable print sample stored in said first dot information storing means, determining the extent of agreement between the compared dot information, determining whether the print pattern on said object is acceptable, and issuing the result of the determination; and automatic sorting means for sorting the object fed by said feed means based on the results of the determination issued by said determining means.

11. An automatic print sorting system according to claim 10, wherein said printing means comprises an ink jet printer.

12. An automatic print sorting system according to claim 10, wherein a plurality of objects are successively fed by said feed means, and the print patterns on said objects are determined and sorted at a rate of 10 to 13 objects per second.

* * * * *

UNITED STATES PATENT AND TRADEMARK OFFICE
CERTIFICATE OF CORRECTION

PATENT NO. : 4,872,024

DATED : Oct. 3, 1989

INVENTOR(S) : Teiji Nagai, et al

It is certified that error appears in the above-identified patent and that said Letters Patent is hereby corrected as shown below:

On the title page

The 2nd and 3rd inventor's names are incorrectly recorded, "Ryo Sakazume and Kouichi Hanazawa", should be:

--Ryou Sakazume and Koichi Hanazawa--

Signed and Sealed this

Ninth Day of October, 1990

Attest:

HARRY F. MANBECK, JR.

*Attesting Officer*    *Commissioner of Patents and Trademarks*